Feb. 11, 1969   J. N. DEWS ET AL   3,426,444
LABORATORY AEROSOL DEVICE
Filed Aug. 9, 1967   Sheet 1 of 2

INVENTORS
Jule N. Dews
George W. Schmersahl

BY: *Harry M. Saragovitz,*
*Edward J. Kelly,*
*Herbert Berl &*
*Muzio B. Roberto*   ATTORNEYS.

Fig. 2

INVENTORS
Jule N. Dews
George W. Schmersahl 3,426,444
LABORATORY AEROSOL DEVICE
Jule N. Dews and George W. Schmersahl, Frederick, Md., assignors to the United States of America as represented by the Secretary of the Army
Filed Aug. 9, 1967, Ser. No. 659,544
U.S. Cl. 34—218                                    2 Claims
Int. Cl. F26b 25/00, 19/00

ABSTRACT OF THE DISCLOSURE

An apparatus and system for the suspension of a sample of dry powder in a moving stream of controlled air. A conical vessel having a flat top, a reduced lower section, and a neck portion. A tube supported by a rubber stopper positioned axially inside the vessel and extending outside the vessel to a point substantially near the flat top portion thereof. The lower end of the protruding tube being connected in turn to a vacuum supply. A controlled air intake orifice positioned on the reduced section near and essentially tangent to the periphery of the vessel.

---

The invention described herein may be manufactured and used for or by the Government of the United States of America for Governmental purposes without the payment to us of any royalty thereon.

This invention relates to a small environmental chamber utilized in the study of aerosols.

Research in microbial aerobiology depends upon generating reproducible aerosols in controlled environments and for studying the behavior of these aerosols in time. The most important biological factors which influence airborne microorganisms are solar radiation, relative humidity, temperature, and time. The sum effect of these factors is called biological decay.

Large cloud chambers of various geometries have been constructed to test properties such as the biological decay of microbial aerosols. Illustrative of these are those disclosed by Wolfe in Bacteriological Reviews 25, No. 3, pages 194 to 222. However, these chambers are expensive to build and time consuming to operate. What was needed was a much simpler device which, although not measuring all the quantitative parameters of microbial aerosols, could be effectively used in the laboratory for screening purposes, with the ultimate tests being performed in the large cloud chambers, or in the open atmosphere. One of the problems to be overcome in the design of such a device is insuring that all of the aerosolized particles were retained and none allowed to escape. The magnitude of this problem is more apparent when it is considered that microbial particles are usually under 20 microns in size, and quite often 1 to 5 microns in size.

In addition to the devices disclosed by Wolfe, conventional aerosols tester now in use comprise a large cylindrical tank having a fan of very low kinetic energy centrally positioned therein. Orifices positioned in the side of the tank and for the tank provide means for charging of the tank and for subjecting the suspended dry power to controlled environmental conditions. However, one of the drawbacks of the standard aerosol tank is that the dry powder in time has a tendency to decay physically due to fall-out. Therefore, the measurement of bio-decay in a conventional aerosol test tank may be unavoidably confounded with physical loss due to physical drop-out of the dry sample from the gas suspension. In addition, agglomeration of particles is more likely to occur due to the low kinetic energy of the lightly stirred aerosol test tank.

It is an object of the invention to provide and disclose an aerosol apparatus of simple design.

It is a further object of the invention to provide and disclose an apparatus having utility in the suspension of a sample of dry powder in an intricately contrived bed of moving gases.

It is a further object of the invention to provide and disclose an apparatus which incloses the suspension of a dry powder within a clearly defined spacial zone.

It is a further object of the invention to provide and disclose an apparatus wherein a suspended dry powder has the attribute of essentially zero physical decay.

It is a further object of the invention to provide and disclose an apparatus which generates relatively high mechanical energy thereby discouraging agglomeration of aerosolized powder particles.

It is a further object of the invention to provide and disclose a system utilizing an aerosol apparatus.

Other objects and a fuller understanding of the invention may be had by referring to the following description and claims taken in conjunction with the accompanying drawing in which:

FIGURE 2 shows a schematic view of the system employing the aerosol apparatus.

Figure 1:
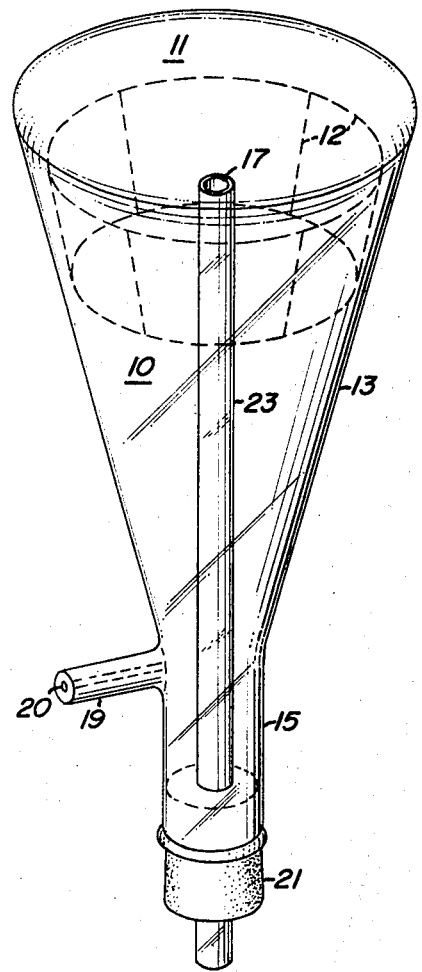
FIGURE 1 shows a prospective view of the aerosol apparatus.

Referring now to FIGURE 1 of the drawings, the apparatus comprises vessel 10 having a conical configuration with closed flat top surface 11, tapered surface 13 and non-tapered surface or neck portion 15. Positioned tangentially on the periphery of non-tapered surface 15 is stem 19 comprising orifice 20 extending therethrough to the interior of the conical vessel 10. Orifice 20 serves as a means of entrance for the passage of controlled air, e.g., as to humidity and temperature, into the interior of vessel 10. The non-tapered surface of vessel 10 terminates into an open end (not shown). Stopper 21 which comprises a bore (not shown) in the center position thereof extending axially therethrough, is positioned in the open end and at the neck of vessel 10. The stopper may be constructed of any suitable material, e.g., rubber. Cylindrical elongated tubing 23 is supported in the bore and extends axially through the interior of vessel 10 to a point substantially near interior top surface 11. Tubing 23 may be constructed of any suitable rigid material, e.g., glass.

Figure 2:
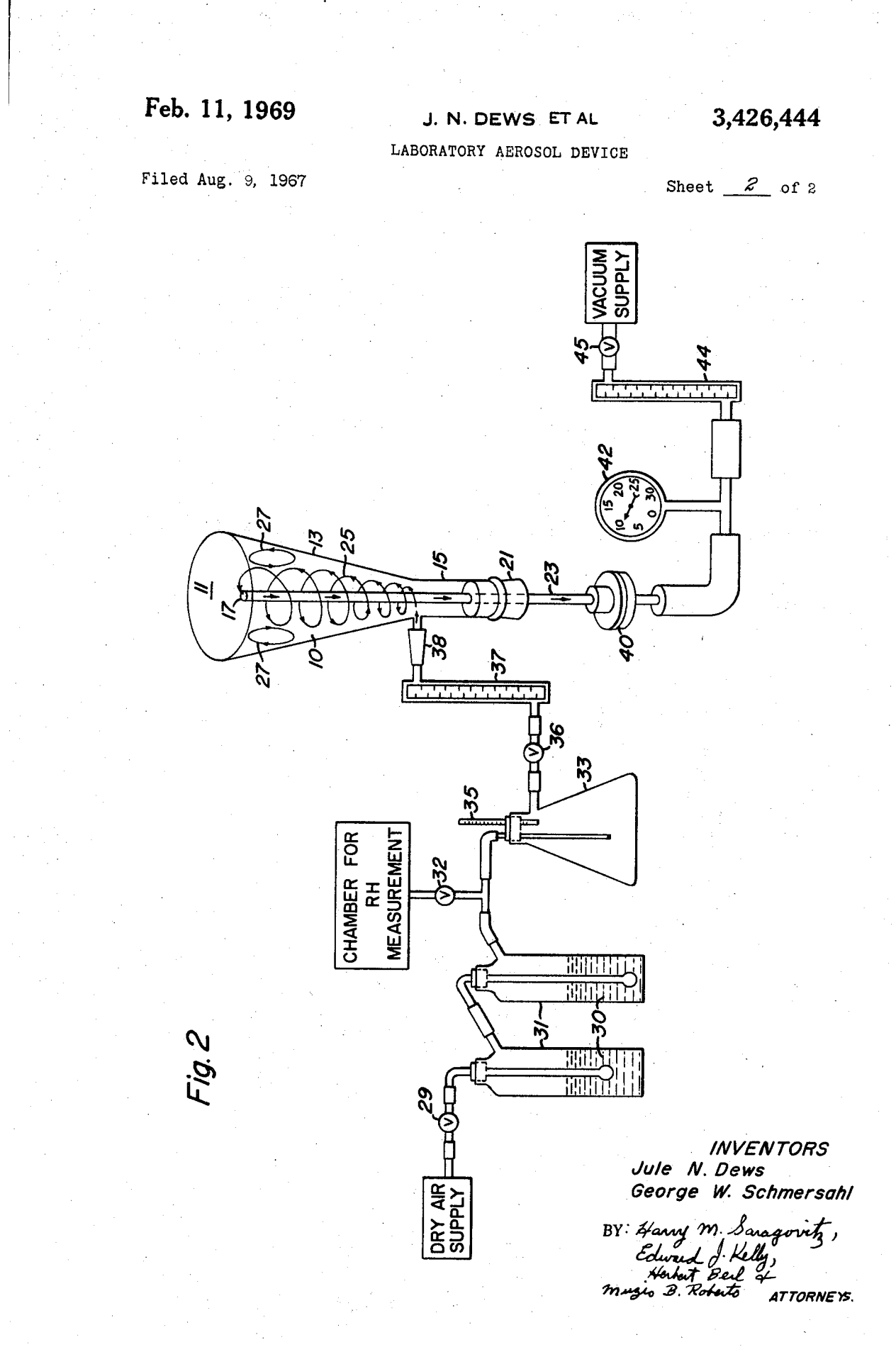

The power suspension and powder-retention forces are entirely self-acting, dependent upon a deliberately contrived vessel for its operation. More particularly, operability of the apparatus is based upon the application of aerodynamic principles pertaining to sources, sinks, vortices, vortex filaments, as well as a three-dimension helix vortex. This dynamically-stable support and retention system can sustain and retain a dry powder sample in suspension for an indefinite period of time. In the present apparatus energizing gases 25, as shown in FIGURE 2, enter the chambers of vessel 10 through orifice 20. Due to the configuration of the apparatus and to the motivation of an applied vacuum to the system, these energizing gases travel in spiral vortex (helix) path as they traverse the chamber of the apparatus. As the gases travel a spiral pathway toward the top portion of the apparatus to exit at sink 17, the diameter of the spiral and the pitch or distance between each spiral increases in an incremental amount proportional to the incremental increase of the diameter of the vessel. In addition, the speed or rate of movement of the spirals increase proportionally to the increase in diameter and pitch.

In addition to energizing spiral air vortex 25, secondary vortices or "vortex filaments" 27, comprising circulating molecules of gases, are also found within the chamber of the apparatus. These circulating molecules of air derive their circulating energy from central spiral vortex 25. However, unlike vortex 25 which leaves the chamber, secondary vortices 27 recycle in a continuous vertical vortex loop, thereby never leaving the chamber. The suspended and retained particles reside and are imprisoned in this secondary vortex.

An analogy may be made by comparing a particle supported by the present system to a person who is walking against a spiral escalator, whereupon the person's position is relatively fixed spacially, yet in motion with respect to the spiral escalator tredle. The analogy may be expanded to have the escalator in motion at gradually diminished speeds commencing from its spiral base, while the person is walking at a constant speed against the motion of the tredle. In this analogy, it can be seen that the person will be confined to a position upon the spiral escalator and remain stationary at this location.

Furthermore, because of the considerable air mass transfer in the energizing vortex, which is necessary to mechanically operate the system, i.e., 0.375 cubic feet l./min., abundant kinetic energy is available to keep the powder particles dispersed which aborts agglomeration of particles. The agglomeration of particles constitutes a problem in testing powders in a conventional aerosol test chamber.

As a specific example of one use of the aerosol device, reference is made to the system illustrated in FIGURE 2. This system is used to test the effect of air having a particular relative humidity upon the viability of suspended microbial particles.

In the system, dry compressed air is supplied from a dry air source supply by means of valve 29, to a series of 2 to 6 wash bottles 31, which are filled with distilled water 30 to control the relative humidity of the air. The contents of wash bottles 31 are maintained at the desired temperature by the utilization of a conventional heating mantle (not shown). The moisture containing gases are then circulated to a chamber for the measurement of the relative humidity therein utilizing conventional wet and dry bulb thermometers or a human hair hygrometer by means of valve 32. The gas containing the desired amount of moisture is then circulated to wet air temperature monitoring flask 33 having thermometer 35 positioned therein, and through rotameter 37 by means of valve 36 to measure the flow rate of the gases. The flow rate is adjusted to about 0.8 cubic feet per minute. Rotameter 37 is attached to vessel 10 by means of connection 38 which comprises an overbleed. The dry air supply, wash bottles, chamber for measuring Rh, air temperature monitoring flask, rotameter and the conical vessel are operable connected with suitable gas conduit means, e.g., glass tubing and/or plastic or rubber hosing.

The material to be evaluated is placed into conical vessel 10 of the disassembled system while the vessel is held in an inverted position. The system is assembled and the vacuum applied while conical vessel 10 is in an inverted position. While in an inverted position, the sample lies on interior flat top surface 11. However, when the conical vessel is returned to an upright position as shown in FIGURE 2, and the system is in operation, the particles are suspended as shown in zone 12 of FIGURE 1. Controlled energized gases adjusted as to humidity and temperature flow into the interior of vessel 10, which fluidizes the material contained therein, thereby forming a small contained and supported aerosol. The energized air is drawn through the interior of vessel 10 by means of a conventional vacuum supply through valve 45. Positioned between cylindrical tubing 23 and vacuum supply 46, is rotameter 44, vacuum gauge 42, calibrated in inches of mercury, and monitoring millipore filter 40. Cylindrical tubing 23, monitoring millipore filter 40, vacuum gauge 42, rotameter 44, valve 45, and vacuum supply 46 are operable interconnected by suitable conduit means, e.g., glass tubing and/or rubber or plastic laboratory housing.

After exposure for a selected period of time, the aerosol suspension is terminated by inverting the conical apparatus. The conical apparatus is removed from the system.

The formerly aerosolized powder is then reconstituted into a liquid suspension by delivering a known volume, e.g., 100 ml. of diluent into the environmental chamber and then determining the number of living cells through conventional culturing techniques. The influence of relative humidity upon the viability of the microbial material is obtained by a comparison of the number of viable cells after aerosolization with the number of viable cells of an unaerosolized powder sample of identical size.

An inherent advantage occurring from the utilization of our device is that the particles may be suspended for months with little or no apparent physical decay. Thus, the influence of time on biological decay is always inherently tested. Also, it is obvious that factors affecting biological decay other than relative humidity may be tested in our device. Ultraviolet lamps may be utilized to test the influence of solar radiation on microbial particles by using a chamber which is sensitive to ultraviolet radiation. Our device may be also used to study the influence upon viability of microorganisms of various gaseous environments such as oxygen, nitrogen, etc., of temperature, and of antimicrobial agents. In addition our device may be utilized in the sampling of particulate matter from the atmosphere by attaching the device to a vehicle, in that any particles induced into vessel 10 through orifice 20 are collected and retained in zone 12.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

Having described our invention, we claim:

1. A small environmental chamber for the study of particles of aerosols comprising a conical configuration having a flat top surface; a tapered upper portion; and untapered lower portion terminating into an open end; orifice means located on the periphery of the untapered lower portion, sink means positioned at a point substantially near the interior of the flat top surface and extending axially downwardly therefrom, support for sink means positioned in the open end.

2. A system for exposing the particles of an aerosol to air at a particular relative humidity comprising the combination in series of a dry air supply means, a valve and rotameter to control the flow rate of dry air, filter means for filtering out gross impurities, a gas washing bottle for imparting a chosen relative humidity to said dry air, a conical chamber having air inlet means, sink means positioned in the conical chamber, and protruding therefrom, vacuum means connected to the protruding sink means, filter means and vacuum measuring means positioned between the sink and vacuum means, and suitable conduit means operable interconnecting the system whereby said particles in said chamber are readily aerosolized with a suitable stream of air and vacuum pressure.

References Cited
UNITED STATES PATENTS 2,794,269 6/1957 Isaacs _____ 34—218 XR
3,308,558 3/1967 Orlando _____ 34—218

KENNETH W. SPRAGUE, *Primary Examiner.*